United States Patent Office 3,426,077
Patented Feb. 4, 1969

3,426,077
LOW FOAMING BIODEGRADABLE SURFACTANT COMPOSITIONS
Fred S. Eiseman, Jr., Maplewood, and Leslie M. Schenck, Mountainside, N.J., assignors to GAF Corporation, a corporation of Delaware
No Drawing. Filed Apr. 21, 1964, Ser. No. 361,540
U.S. Cl. 260—615                                    4 Claims
Int. Cl. C07c 43/12

ABSTRACT OF THE DISCLOSURE

Novel low-foaming and biodegradable non-ionic chloride surfactant compositions having good detergency, which are the chlorides of non-ionic surface active agents obtained by condensing 1 molar proportion of a straight chain alkanol of from 8 to 12 carbon atoms with from 6.7 to 20.8 molar proportions of ethylene oxide, said novel compositions having the formula $$R—(OCH_2CH_2)_nCl$$

wherein R represents a linear alkyl group containing from 8 to 12 carbon atoms, $n$ is an integer having an average value of from 6.7 to 20.8 such that the oxyethylene groups constitute from 66.6 to 81.6% by weight thereof.

---

This invention relates to new and useful low foaming biodegradable surfactant (surface active agent) compositions and more particularly to compositions of low foaming biodegradable nonionic surfactants having 8 to 12 carbon atom linear hydrocarbon radicals (straight chain) as hydrophobic groups and having the hydroxyl groups in the surfactant molecule replaced by chloride radicals.

Chlorides of a number of polyethoxylated aliphatic alcohols wherein the hydroxyl groups in the sufactant molecule have been replaced by chloride groups are known in the art and have been employed for example as intermediates in the synthesis of sulfonate or amine derivatives which are useful as surfactants. The chlorine radicals in these polyethoxylated alcohol derivatives are sufficiently reactive to form the desired sulfonates or amines. U.S. Patent 3,061,552 discloses that these chloride derivatives are also valuable as nondiscoloring nonionic surfactants for use in the formulation of alkaline detergents or the like.

Methods for the preparation of polyethoxylated aliphatic alcohols useful in the synthesis of these chloride derivatives are described in U.S. Patents 1,970,578, 2,213,-477, 2,575,832, 2,593,112 and 2,676,975. Usually, these polyethoxylated aliphatic alcohols are prepared by reaction of the desired aliphatic alcohol with the desired number of moles of ethylene oxide in the presence of a catalyst such as sodium hydroxide or the like. Methods for preparation of chloride derivatives of these polyethoxylated aliphatic alcohols are disclosed in U.S. Patents 2,249,111, 2,098,203, 2,097,441, 2,097,411, 2,209,911 and 3,061,552. One general method for the preparation of these chloride derivatives involves reaction of 1 mole of thionyl chloride with 1 mole of the desired polyethoxylated aliphatic alcohol.

It is an object of this invention to provide new and useful low foaming biodegradable surfactant compositions and more particularly nonionic surfactant compositions containing chloride derivatives of polyethoxylated aliphatic alcohols in which the aliphatic alcohols contain a linear hydrocarbon radical as the hydrophobic moiety. Another object is to provide new and useful low foaming biodegradable detergent compositions containing these chlorides as surfactants. Other objects and advantages of this invention will appear as this description proceeds.

The objects of this invention are attained by our unexpected discovery that when 8 to 12 carbon atom linear hydrocarbon (straight chain) alcohol ethoxylates containing from 69 to 83.5% of ethylene oxide by weight are converted into their corresponding chloride derivatives by replacement of the hydroxyl groups in the surfactant molecule with chloride radicals, the resulting nonionic surfactants are not only biodegradable, but are also valuable as low foaming nonionic surfactants. The compounds of this invention are characterized by the following formula:

$$R—(OCH_2CH_2)_nCl$$

wherein R represents a linear alkyl group having from 8 to 12 carbon atoms or mixtures of such alkyl groups and $n$ is a positive integer of such magnitude to incorporate from 66.6 to 81.6% ethylene oxide by weight into the surfactant molecule.

Although the chlorides of polyethoxylated nonlinear (branched chain) aliphatic alcohols containing from 66.6 to 81.6% ethylene oxide by weight have excellent stabilities toward alkaline materials and may be formulated with these alkaline materials as well as builders, these chlorides are not easily biodegradable and do not exhibit the superior low foaming and other detergent properties which are obtained with the corresponding chlorides of polyethoxylated linear aliphatic alcohols. In view of the teachings of the prior art, it is completely unexpected that chlorides of polyethoxylated linear aliphatic alcohols containing from 8 to 12 carbon atoms would exhibit such desirable biodegradability and low foaming characteristics.

Linear hydrocarbon (straight chain) alcohols may be obtained from a variety of sources. These alcohols, as such, occur widely in nature in volatile oils, and as esters in volatile oils, fats, fatty oils, waxes or the like. If the alcohols are present in these oils as alcohols, they may be separated from the oils by distillation. If they are present in the form of esters, the esters may be saponified and the alcohols separated from the saponification mixture by distillation. Linear hydrocarbon alcohols may also be obtained by reduction of fatty acids, esters of fatty acids, glycerides of fatty acids or the like. The most common forms of reduction of these acids are with metallic sodium or catalytic hydrogenation. Although it is possible to reduce fatty acids with hydrogen under high pressures, most recent processes employ fatty acid esters rather than free fatty acids. In some of these hydrogenation processes, glycerides of fatty acids are employed, but usually esters such as the methyl esters or the like are preferred because they eliminate problems connected with glycerol recovery and glycerol losses caused by decomposition during the reduction. Normally, these esters are obtained from the glycerides of the fatty esters by alcoholysis. When linear alcohols are obtained by reduction of fatty esters with metallic sodium, the hydrogen used in the reduction is obtained by reaction of metallic sodium with a reducing alcohol.

Linear alcohols may also be obtained from olefins rather than fatty acids. One such synthetic process for producing these alcohols is the oxo process which involves the addition of one mole of carbon monoxide and 2 moles of hydrogen to an α-olefin in the presence of a Fischer-Tropsch catalyst. Another synthetic process is the Ziegler or trialkyl aluminum process which is described in Kirk-Othmer "Encyclopedia of Chemical Technology," v. 1, p. 560 (John Wiley & Sons, New York, N.Y., 2nd ed., 1963). This process involves the reaction of ethylene with a trialkyl aluminum catalyst to form higher molecular weight aluminum alkyls and subsequent reaction of these alkyls to obtain mixtures of linear hydrocarbon alcohols. Mixtures of linear hydrocarbon alcohols are obtained in both of these processes and may be used as alcohol mixtures or specific alcohols may be separated from these mixtures and used individually. It is to be understood that linear hydrocarbon alcohols produced by other methods may also be used in the practice of this invention.

As examples of linear hydrocarbon alcohols which may be used in the present invention there may be mentioned alcohols such as 1-octanol, 1-decanol, 1-dodecanol, mixtures of these alcohols or the like. 1-octanol obtained commercially as a byproduct in the hydrogenation of coconut oil fatty acids may be used. Likewise 1-decanol obtained from catalytic reduction of coconut oil or coconut oil fatty acids or esters under high pressures may also be used. Commercial alcohols obtained from the Ziegler process such as mixtures of 50% 1-decanol and 45% 1-octanol may be used. 1-dodecanol (lauryl alcohol) obtained by the reduction of ethyl laurate may also be used.

Linear alcohol ethoxylates useful in the preparation of the chloride derivations disclosed in this invention may be obtained by reaction of linear hydrocarbon alcohols having from 8 to 12 carbon atoms with from 69 to 83.5% of ethylene oxide in the presence of an alkaline catalyst such as sodium hydroxide or the like. Ethoxylates of linear alcohols containing 10 carbon atoms or mixtures of such alcohols having an average of about 10 carbon atoms in the alkyl chain and containing from about 73.5 to 79.7% of ethylene oxide by weight are particularly valuable as low foaming biodegradable surfactants. The surfactant compositions disclosed in this invention are evaluated by the following laboratory methods.

The "Hamilton Beach Foam Test" is used to evaluate the foaming characteristics of surfactants. This test involves placing 200 ml. of an aqueous solution containing 0.1% of the surfactant to be tested in a thermoregulated baffled test cell heated to the desired test temperature. The solution is agitated for 3 minutes in the test cell using a standard Hamilton Beach milk shake mixer. At the end of 3 minutes agitation is stopped and the height of foam is measured after 5 seconds and reported in centimeters. This test simulates the foaming obtained in systems where high speed agitation is used.

The Draves wetting test is used to measure the wetting properties of surfactants. Details of this test are given in the Am. Dyestuff Reptr., 20,201 (1931) and Am. Dyestuff Reptr., 28,421 (1939). In the Draves test the concentration of surfactant required to give a wet-out time of 25 seconds at 25° C. is determined. Briefly, this test involves submerging a 5 g. skein of gray cotton yarn in the test solution by means of a weight. As the solution wets the yarn, air is progressively displaced and the buoyancy of the skein decreases until at the end point of the test, the skein sinks. The time in seconds required to reach the endpoint is recorded. By successive adjustments in the concentration of the test solution, a 25 second wetting endpoint is obtained.

The percent biodegradability of surfactants is determined by the Warburg Respirometer Technique. The percent biodegradability of the surfactant being tested is compared to that obtained with linear alkyl benzene sulfonate taken at 100%. The test involves determination of the amount of oxygen utilized in a Warburg Respirometer by microorganisms in oxidizing the surfactant being tested in accordance with the procedure outlined by Kenkelstein & Rand in "Sewerage and Industrial Waste," vol. 27, No. 9, September 1955.

The following examples illustrate preferred forms of the present invention. These examples are only illustrative of the invention and are not to be regarded as limitative. It is to be understood that all parts, percents and proportions referred to herein and in the appended claims are by weight unless otherwise indicated. All references as to temperatures are in degrees centigrade unless indicated otherwise.

EXAMPLE 1

A total of 58 parts of thionyl chloride is added over a two hour period at 50–55° C. to 250 parts of a polyglycol monoether obtained by condensation of a branched chain oxo-decyl alcohol with 10 moles of ethylene oxide (hereafter referred to as branched chain oxo-decyl alcohol ethoxylate). Following the addition, the charge is heated to 100° C. over a two hour period and held at this temperature for 4 hours. Excess thionyl chloride and hydrogen chloride are then removed by vacuum stripping the reaction mixture at 100° C. for 2 hours. The surfactant obtained by this procedure has the following properties:

Cloud point 1% aqueous solution) _____° C__ 30
Hamilton Beach foam at 60° C. (0.1% surfactant—5 sec. value) _____cm__ 0.7
Draves wetting at 25° C. (percent concentration by weight required for 25 second wet-out time) _____percent__ 0.062
Percent biodegradability by Warburg Respirometer Technique as compared with linear alkylbenzene sulfonate as 100% _____percent__ 25

EXAMPLE 2

Example 1 was repeated with the exception that 250 parts of a polyglycol monoether of a straight chain Ziegler type decyl alcohol with 10 moles of ethylene oxide is substituted for the 250 parts of branched chain oxo-decyl alcohol ethoxylate. The surfactant obtained by this procedure has the following properties:

Cloud point 1% aqueous solution) _____° C__ 30
Hamilton Beach foam at 60° C. (0.1% surfactant—5 sec. value) _____cm__ 0.7
Draves wetting at 25° C. (percent concentration required for 25 second wet-out time) ___percent__ 0.044
Percent biodegradability by Warburg Respirometer Technique as compared with linear alkylbenzene sulfonate as 100% _____percent__ 109

EXAMPLE 3

Example 1 was repeated with the exception that 242 parts of a polyglycol monoether of iso-octyl alcohol with 10 moles of ethylene oxide is substituted for the 250 parts of branched chain oxo-decyl alcohol ethoxylate. The surfacant obtained by this procedure has the following properties:

Cloud point (1% aqueous solution) _____° C__ 45
Hamilton Beach foam at 60° C. (0.1 surfactant—5 sec. value) _____ 0.0
Draves wetting at 25° C. (percent concentration required for 25 second wet-out time) __percent__ 0.142
Percent biodegradability by Warburg Respirometer Technique as compared with linear alkylbenzene sulfonate as 100% _____percent__ 18

EXAMPLE 4

Example 1 was repeated with the exception that 242 parts of a polyglycol monoether of n-octyl alcohol with 10 moles of ethylene oxide is substituted for the 250 parts of branched chain oxo-decyl alcohol ethoxylate. The surfactant obtained by this procedure has the following properties:

Cloud point (1% aqueous solution) _____° C__ 44.6
Hamilton Beach foam at 60° C. (0.1% surfactant—5 sec. value) _____ 0.0
Draves wetting at 25° C. (percent concentration required for 25 second wet-out time) __percent__ 0.042
Percent biodegradability by Warburg Respirometer Technique as compared with linear alkylbenzene sulfonate as 100%) _____percent__ 119

EXAMPLE 5

Example 1 was repeated with the exception that 183 parts of a polyglycol monoether of 2-ethyl hexyl alcohol with 7 moles of ethylene oxide is substituted for the 250 parts of branched chain oxo-decyl alcohol ethoxylate. The surfactant obtained by this procedure has the following properties:

Cloud point (1% aqueous solution) _____° C__ <0
Hamilton Beach foam at 60° C. (0.1% surfactant—5 sec. value) _____ 0.0
Draves wetting at 25° C. (percent concentration required for 25 second wet-out time) __percent__ 0.140
Percent biodegradability by Warburg Respirometer Technique as compared with linear alkylbenzene sulfonate as 100% _____percent__ 16

EXAMPLE 6

Example 1 was repeated with the exception that 183 parts of a polyglycol monoether of a linear oxo-octyl alcohol with 7 moles of ethylene oxide is substituted for the 250 parts of branched chain oxo-decyl alcohol ethoxylate. The surfactant obtained by this procedure has the following properties:

Cloud point (1% aqueous solution) _____° C__ <0
Hamilton Beach foam at 60° C. (0.1% surfactant—5 sec. value) _____ 0.0
Draves wetting at 25° C. (percent concentration required for 25 second wet-out time) __percent__ 0.073
Percent biodegradability by Warburg Respirometer Technique as compared with linear alkylbenzene sulfonate as 100% _____percent__ 107

EXAMPLE 7

Example 1 was repeated with the exception that 320 parts of a polyglycol monoether of n-octyl alcohol with 14.5 moles of ethylene oxide is substituted for the 250 parts of branched chain oxo-decyl alcohol ethoxylate. The surfactant obtained by this procedure has the following properties:

Cloud point (1% aqueous solution) (turbid) __° C__ 30
Hamilton Beach foam at 60° C. (0.1% surfactant—5 sec. value) _____cm__ 4.7
Draves wetting at 25° C. (percent concentration required for 25 second wet-out time) __percent__ 0.18
Percent biodegradability by Warburg Respirometer Technique as compared with linear alkylbenzene sulfonate as 100% _____percent__ 121

EXAMPLE 8

Example 1 was repeated with the exception that 320 parts of a polyglycol monoether of 2,3-dimethylhexanol with 14.5 moles of ethylene oxide is substituted for the 250 parts of branched chain oxo-decyl alcohol ethoxylate. The surfactant obtained by this procedure has the following properties:

Cloud point (1% aqueous solution) (turbid) ° C__ 30
Hamilton Beach foam at 60° C. (0.1% surfactant—5 sec. value) _____cm__ 8.9
Draves wetting at 25° C. (percent concentration required for 25 second wet-out time) __percent__ 0.29
Percent biodegradability by Warburg Respirometer Technique as compared with linear alkylbenzene sulfonate as 100% _____percent__ 9

EXAMPLE 9

Example 1 was repeated with the exception that 455 parts of a polyglycol monoether of 4-methyl 6-ethyl nonanol with 20 moles of ethylene oxide is substituted for the 250 parts of branched chain oxo-decyl alcohol ethoxylate. The surfactant obtained by this procedure has the following properties:

Hamilton Beach foam at 60° C. (0.1% surfactant—5 sec. value) _____cm__ 6.1
Draves wetting at 25° C. (percent concentration required for 25 second wet-out time) __percent__ 0.27
Percent biodegradability by Warburg Respirometer Technique as compared with linear alkylbenzene sulfonate as 100% _____percent__ 16

EXAMPLE 10

Example 1 was repeated with the exception that 455 parts of a polyglycol monoether of n-dodecanol with 20 moles of ethylene oxide is substituted for the 250 parts of branched chain oxo-decyl alcohol ethoxylate. The surfactant obtained by this procedure has the following properties:

Hamilton Beach foam at 60° C. (0.1% surfactant—5 sec. value) _____cm__ 3.7
Draves wetting at 25° C. (percent concentration required for 25 second wet-out time) __percent__ 0.13
Percent biodegradability by Warburg Respirometer Technique as compared with linear alkylbenzene sulfonate as 100% _____percent__ 118

EXAMPLE 11

Example 1 was repeated with the exception that 260 parts of a polyglycol monoether of n-dodecanol with 10 moles of ethylene oxide is substituted for the 250 parts of branched chain oxo-decyl alcohol ethoxylate. The surfactant obtained by this procedure has the following properties:

Hamilton Beach foam at 60° C. (0.1% surfactant—5 sec. value) _____cm__ 3.4
Draves wetting at 25° C. (percent concentration required for 25 second wet-out time) ____percent__ 0.09
Percent Biodegradability by Warburg Respirometer Technique as compared with linear alkylbenzene sulfonate as 100% _____ percent__ 113

EXAMPLE 12

Example 1 was repeated with the exception that 260 parts of a polyglycol monoether of 2,4,6-trimethyl nonanol with 10 moles of ethylene oxide is substituted for the 250 parts of branched chain oxo-decyl alcohol ethoxylate. The surfactant obtained by this procedure has the following properties:

Hamilton Beach foam at 60° C. (0.1% surfactant—5 sec. value) _____cm__ 9.4
Draves wetting at 25° C. (percent concentration required for 25 second wet-out time) ___perecent__ 0.39
Percent biodegradability by Warburg Respirometer Technique as compared with linear alkylbenzene sulfonate as 100% _____percent__ 3

EXAMPLE 13

Example 1 was repeated with the exception that 256 parts of a polyglycol monoether of nonylphenol with 9 moles of ethylene oxide is substituted for the 250 parts of branched chain oxo-decyl alcohol ethoxylate. The surfactant obtained by this procedure has the following properties:

Cloud point (1% aqueous solution) _____° C__ 26
Hamilton Beach foam at 60° C. (0.1% surfactant—5 sec. value) _____cm__ 4.2
Draves wetting at 25° C. (percent concentration required for 25 second wet-out time) ___percent__ >1.00
Percent Biodegradability by Warburg Respirometer Technique as compared with linear alkylbenzene sulfonate as 100% _____percent__ 0

EXAMPLE 14

Example 1 was repeated with the exception that 323 parts of a polyglycol monoether of oxo-decyl alcohol with 14 moles of ethylene oxide is substituted for the 250 parts of branched chain oxo-decyl alcohol ethoxylate. The surfactant obtained by this procedure has the following properties:

Cloud point (1% aqueous solution) _____° C__ 44
Hamilton Beach foam at 60° C. (0.1% surfactant—
  5 sec. value) _____cm__ 2.7
Draves wetting at 25° C. (percent concentration required for 25 second wet-out time) ___percent__ 0.10
Percent Biodegradability by Warburg Respirometer Technique as compared with linear alkylbenzene sulfonate as 100% _____percent__ 31

EXAMPLE 15

Example 1 was repeated with the exception that 323 parts of a polyglycol monoether of n-decyl alcohol with 14 moles of ethylene oxide is substituted for the 250 parts of branched chain oxo-decyl alcohol ethoxylate. The surfactant obtained by this procedure has the following properties:

Cloud point (1% aqueous solution) _____° C__ 43.2
Hamilton Beach foam at 60° C. (0.1% surfactant—
  5 sec. value) _____cm__ 0.3
Draves wetting at 25° C. (percent concentration required for 25 seconds wet-out time) __percent__ 0.038
Percent Biodegradability by Warburg Respirometer Technique as compared with linear alkylbenzene sulfonate as 100% _____percent__ 109

EXAMPLE 16

Example 1 was repeated with the exception that 263 parts of a polyglycol monoether of straight chain Ziegler nine carbon average alcohol with 11 moles of ethylene oxide is substituted for the 250 parts of branched chain oxo-decyl alcohol ethoxylate. The surfactant obtained by this procedure has the following properties:

Hamilton Beach foam at 60° C. (0.1% surfactant—
  5 sec. value) _____cm__ 0.0
Draves wetting at 25° C. (percent concentration required for 25 seconds wet-out time) __percent__ 0.042
Percent Biodegradability by Warburg Respirometer Technique as compared with linear alkylbenzene sulfonate as 100% _____percent__ 113

EXAMPLE 17

Example 1 was repeated with the exception that 370 parts of a polyglycol monoether of oxo-decyl alcohol with 10 moles of ethylene oxide and 5 moles of propylene oxide is substituted for the 250 parts of branched chain oxo-decyl alcohol ethoxylate. The surfactant obtained by this procedure has the following properties:

Cloud point (1% aqueous solution) _____° C__ 46
Hamilton Beach foam at 60° C. (0.1% surfactant—
  5 sec. value) _____cm__ 2.7
Draves wetting at 25° C. (percent concentration required for 25 second wet-out time) ___percent__ 0.11
Percent Biodegradability by Warburg Respirometer Technique as compared with linear alkylbenzene sulfonate as 100% _____percent__ 7

EXAMPLE 18

Low foaming surfactants described in Example 2 and Example 15 are formulated as machine dishwashing detergents by mixing 5% of each surfactant by weight with 95% by weight of a builder consisting of 1 part of sodium metasilicate with 3 parts of sodium tripolyphosphate. The foaming properties of the builders used in these two formulations as well as the formulations themselves and a commercial machine dishwashing detergent are tested by using these formulations in a Kitchen Aid dishwashing machine. This diswashing machine has a rotating arm through which the detergent solution is pumped. The number of revolutions per minute of the arm, which are shown in the table below as foam r.p.m. of agitator, are measured and are dependent on the amount of foam produced by the particular detergent solution. The machine is so equipped that an excess of foam will stop its operation. Consequently, a decrease in foam r.p.m. of agitator in the table below indicates an increase in foam:

MECHANICAL DISHWASHING EVALUATION (Tap water temperature at 140° F./concentration of formulated detergent or builders, 0.25%)

| Surfactant— | Foam r.p.m. of agitator |
|---|---|
| Builders alone | 90 |
| Commercial machine dishwashing detergent | 80 |
| n-Decyl alcohol+10 E.O. chloride (Ex. 2) compounded as machine dishwashing detergent | 86 |
| n-Decyl alcohol+14 E.O. chloride (Ex. 15) compounded as machine dishwashing detergent | 84 |

These results show the two detergents compounded with the surfactants described in Example 2 and Example 15 respectively are superior to the commercial machine dishwashing detergent. Comparable results are obtained in formulations containing 0.05% and 10% (by weight) of these surfactants.

The foregoing examples demonstrate the superior low foaming and biodegradable properties of chlorides of polyethoxylated aliphatic alcohols having linear carbon radicals as hydrophobic groups as compared to the corresponding chlorides derived from polyethoxylated aliphatic alcohols and alkylphenols having nonlinear carbon radicals as part or all of the hydrophobic group.

Chlorides of polyethoxylated aliphatic alcohols having linear alkyl groups containing from 8 to 12 carbon atoms or mixtures of such alkyl groups and containing from 66.6 to 81.6% ethylene oxide by weight and having values of $n$ from 6.7 to 20.8 are useful as low foaming biodegradable surfactants in numerous applications. Such applications include use of these surfactants as detergents, emulsifying agents, wetting agents, demulsifying agents, defoaming agents or the like in products such as low foaming laundry detergents, machine dishwashing compounds, rinse aids, emulsifying agents for use in metal cleaning, metal cutting, dye levelling, petroleum demulsifying, textile processing, water treating, pharmaceutical, adhesives, paint pigment dispersants, general defoaming applications or the like. These chlorides are particularly well suited for use as formulated detergents with builders and the like for use in automatic and other types of power cleaning equipment where foaming is a problem. They are also useful as emulsifying agents in the formulation of emulsion cleaners for use in spray type cleaning equipment. These products may be used as wetting agents and penetrants for biocidal formulations particularly where these formulations are applied as high pressure sprays or as aerial sprays. The products may also be used as dedusting and conditioning agents for detergent compositions. They may also be used as aids in textile, paper and leather processing.

This invention has been disclosed with respect to certain preferred embodiments. Various modifications and variations thereof will become obvious to persons skilled in the art. It is to be understood that such modifications and variations are to be included within the spirit and scope of this invention.

What is claimed is:
1. A low foaming nonionic chloride biodegradable surfactant composition having the formula:

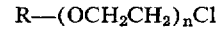

wherein R represents a linear alkyl group containing from 8 to 12 carbon atoms, $n$ is an integer having an average value of from 6.7 to 20.8 such that the oxyethylene groups constitute from 66.6 to 81.6% by weight thereof.

2. A surfactant composition as defined in claim 1 wherein the nonionic surfactant is an n-octyl alcohol derivative containing 10 oxyethylene groups.

3. A surfactant composition as defined in claim 1 wherein the nonionic surfactant is a n-decyl alcohol derivative containing 14 oxyethylene groups.

4. A surfactant composition as defined in claim 1 wherein the nonionic surfactant is a n-dodecyl alcohol derivative containing 20 oxyethylene groups.

References Cited

UNITED STATES PATENTS 2,817,686  12/1957  Cicero et al.
3,061,552  10/1962  Schenck et al.
3,294,847  12/1966  Albright et al.

FOREIGN PATENTS 1,057,814  11/1953  France.

LEON ZITVER, *Primary Examiner.*

H. T. MARS, *Assistant Examiner.*

U.S. Cl. X.R.

8—14, 137; 106—277, 308;
252—79.5, 89, 156, 175, 311, 351; 260—999